Nov. 8, 1927.
C. W. MANZEL
LUBRICATING ATTACHMENT
Filed May 2, 1921
1,648,140
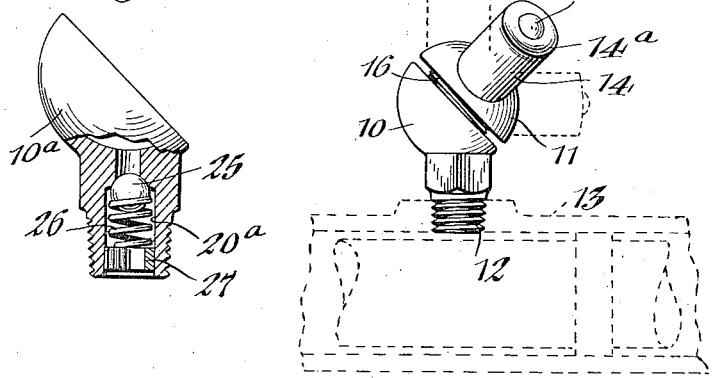
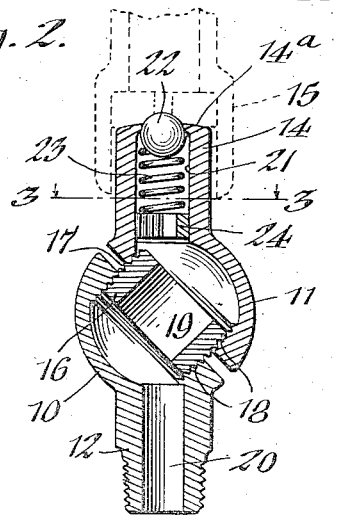
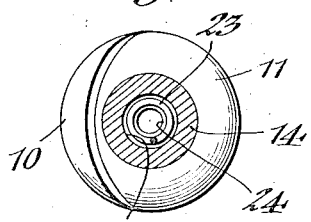
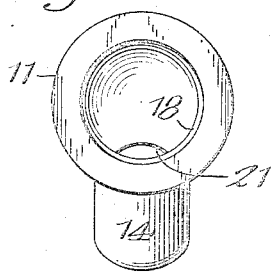
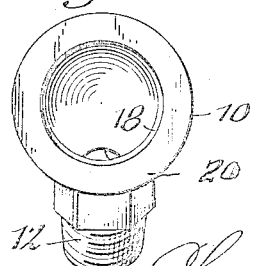
Inventor;
Charles W. Manzel,
by Geyer & Popp
Attorneys.

Patented Nov. 8, 1927.

1,648,140

UNITED STATES PATENT OFFICE.

CHARLES W. MANZEL, OF BUFFALO, NEW YORK, ASSIGNOR TO THE BASSICK MANUFACTURING COMPANY, OF CHICAGO, ILLINOIS, A CORPORATION OF DELAWARE.

LUBRICATING ATTACHMENT.

Application filed May 2, 1921. Serial No. 466,024.

This invention relates to a feed nipple or lubricating attachment intended for use on automobile bearings and the like.

Its object is the provision of an improved universally adjustable attachment of this character which is simple, neat and compact in construction, which is composed of a minimum number of parts, and which can be cheaply manufactured.

In the accompanying drawings: Figure 1 is a side elevation of the improvement attached to a bearing, the latter being shown by dotted lines. Figure 2 is an enlarged vertical section thereof. Figure 3 is a horizontal section thereof on line 3—3, Fig. 2. Figure 4 is a plan view of the hollow coupling device. Figure 5 is an inside view of the upper section of the attachment. Figure 6 is a similar view of the lower section of the attachment. Figure 7 is a modification of the lower section of the improvement.

Similar characters of reference refer to like parts throughout the several views.

This lubricating attachment is adapted to receive lubricant under pressure and thence deliver it to the bearing, these attachments being substituted for the customary grease cups now used on various bearings; for example, those of automobiles. As shown in the drawings, this attachment is preferably composed of two hollow hemi-spherical sections 10, 11, which are adjustable relatively to each other about a common axis and which are also adjustable as a unit about an axis arranged at an angle to said first-named axis. The lower section 10 is provided at its lower end with a screw-threaded stem 12 by means of which the attachment is secured to a bearing shown at 13, while the upper section 11 is provided with a lubricant receiving nipple or inlet 14. The nozzle 15 of a lubricating gun, not shown, is adapted to fit over this nipple and thereby deliver the lubricant under pressure into the same and to the bearings.

The opposing ends of the sections 10, 11 are arranged obliquely, preferably at an angle of approximately 45°. They are adjustably connected by a hollow coupling device preferably in the form of a tubular connection or coupling ring 16 disposed at right angles to the plane of the ends of said sections and provided with an external screw-thread 17, which engages corresponding internal threads 18 in the opposing ends of said sections. This ring is disposed axially of said sections and its bore 19 serves to conduct the lubricant from one section to the other. To provide a fluid-tight joint between the ring and the respective sections 10, 11, said ring is preferably tapered from the center toward both ends. By this construction the sections are not only reliably fastened together and prevented from working loose, but the upper section can be turned about the axis of the coupling ring to any desired or convenient position, or angle, for receiving the lubricant. This adjustment of the upper section may be accomplished by placing a tubular instrument, such as a pipe, over its nipple 14 and turning it in the proper direction to obtain the desired position. As shown in Figs. 1 and 2, there is normally a clearance between the opposing ends of the sections to allow for necessary adjustment of the upper section relatively to the lower one.

The inner portions of the two hemispherical sections together with the ring or conduit 16 form a chamber for receiving the lubricant, the lower section 10 communicating with a discharge passage 20 which extends through the stem 12 and opens into the bearing to be lubricated. The upper section 11 communicates with a passage 21 in the nipple 14, which is provided at its outer end with an inwardly-opening check valve 22 normally held against its seat by a spring 23, one end thereof bearing against a knurled sleeve or plug 24 driven into the lower end of said passage and its other end bearing against the valve. Upon placing the nozzle 15 of the lubricating gun over the nipple 14 and advancing the pump plunger, the pressure exerted on the lubricant therein, opens the valve 22 and delivers the lubricant into the chamber formed by the sections 10, 11, from which it is discharged through the passage 21 into the part to be lubricated.

In Fig. 1 are shown three positions to which the upper section 11 may be turned to present its nipple in an accessible and convenient position to the user supplying lubricant to a given bearing. It will be understood, however, that the same may be turned to various other angles or positions about the axis of the coupling-conduit 16 as a pivot. By partly turning the screw-threaded stem 12 of the lower section on the bearing and rotating the upper section relatively to the lower one, the attachment can be universally adjusted, rendering it possible to place the nipple 14 in any desired position. While such attachments, owing to their universal adjustability, are particularly adapted for use on the bearings of automobiles, they are equally applicable to the bearings of any piece of machinery.

This improved adjustable lubricating attachment is neat and simple and compact in construction. By connecting the sections thereof in the manner shown, there are no square fluid-tight joints required and the attachment can be made in comparatively small sizes and yet afford the necessary passage for the lubricant.

In the modification shown in Fig. 7, the discharge passage 20ª of the lower section 10ª is provided with a downwardly-opening check valve 25 normally held against its seat by a spring 26, one end thereof bearing against a knurled sleeve, or plug 27, driven into the lower end of said passage and its other end bearing against the valve. This type of section is intended more especially for use on automobile water pumps, the two check valves together with the lubricant between them forming a seal which prevents the escape of water through the attachment.

The outer or upper end of the nipple 14 is preferably provided with a convex face, as shown at 14ª, to permit the pump nozzle 15, which fits loosely over the nipple, to rock more or less on said nipple and still maintain a pressure tight joint between the nozzle and said nipple.

I claim as my invention:

1. A lubricating attachment comprising two hollow internally-threaded sections, one of said sections having an inlet passage and the other a discharge passage, and an externally-threaded tubular coupling engaging the threaded portions of said sections, said coupling being arranged obliquely to the axis of said discharge passage and said sections being adjustably connected by said coupling to move about its axis.

2. A lubricating attachment comprising two hollow internally-threaded sections, one of said sections having an inlet passage and the other a discharge passage, and an externally-threaded tubular coupling adjustably connecting said sections and engaging the threaded portions thereof, said coupling being arranged obliquely to the axis of said discharge passage, the said coupling tapering from its center toward its ends.

3. A lubricating attachment comprising two hollow sections, a receiving section and a supporting section, receiving means at one end of the receiving section subjected to thrust longitudinally of the section when lubricant is being injected, a swivel connection between the sections, the axis of said connection intersecting the axis of the receiving section at an angle, and means for fastening said supporting section rigidly on a machine element to be lubricated, to support said receiving element through said swivel connection.

CHARLES W. MANZEL.